United States Patent
Kato

(10) Patent No.: US 8,994,605 B2
(45) Date of Patent: Mar. 31, 2015

(54) WIRELESS IC DEVICE AND ELECTROMAGNETIC COUPLING MODULE

(75) Inventor: Noboru Kato, Takatsuki (JP)

(73) Assignee: Murata Manufacturing Co., Ltd., Kyoto (JP)

(*) Notice: Subject to any disclaimer, the term of this patent is extended or adjusted under 35 U.S.C. 154(b) by 574 days.

(21) Appl. No.: 12/890,895

(22) Filed: Sep. 27, 2010

(65) Prior Publication Data

US 2011/0080331 A1    Apr. 7, 2011

(30) Foreign Application Priority Data

Oct. 2, 2009   (JP) ................. 2009-230367

(51) Int. Cl.
*H01Q 9/26*     (2006.01)
*G06K 19/077*   (2006.01)
*H01Q 1/22*     (2006.01)
*H01Q 1/36*     (2006.01)
*H01Q 9/28*     (2006.01)

(52) U.S. Cl.
CPC ........ *G06K 19/07754* (2013.01); *H01Q 1/2216* (2013.01); *H01Q 1/36* (2013.01); *H01Q 9/285* (2013.01)
USPC ...................... 343/803; 343/700 MS; 343/702

(58) Field of Classification Search
USPC ............... 343/803, 700 MS, 702; 340/572.8
See application file for complete search history.

(56) References Cited

U.S. PATENT DOCUMENTS

| | | |
|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |

(Continued)

FOREIGN PATENT DOCUMENTS

| | | |
|---|---|---|
| DE | 10 2006 057 369 A1 | 6/2008 |
| EP | 0 694 874 A2 | 1/1996 |

(Continued)

OTHER PUBLICATIONS

English translation of NL9100176, published on Mar. 2, 1992.

(Continued)

*Primary Examiner* — Sue A Purvis
*Assistant Examiner* — Hai Tran
(74) *Attorney, Agent, or Firm* — Keating & Bennett, LLP

(57) ABSTRACT

A wireless IC device includes a wireless IC chip, a feeder circuit substrate which is coupled to the wireless IC chip and includes a feeder circuit including an inductance element, and a radiation plate. The inductance element includes a plurality of stacked layers having coil conductors electrically connected, and a coil conductor electrically connected in a middle portion of the inductance element is arranged at an end position in the coil axis direction and faces a coupling portion of the radiation plate.

17 Claims, 11 Drawing Sheets

(56) References Cited

U.S. PATENT DOCUMENTS

| | | |
|---|---|---|
| 6,104,611 A | 8/2000 | Glover et al. |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 7,629,942 B2 * | 12/2009 | Kato ............................. 343/860 |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0044192 A1 | 3/2006 | Egbert |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200782 A1 | 8/2007 | Hayama et al. |
| 2007/0252700 A1 | 11/2007 | Ishihara et al. |
| 2007/0252703 A1 * | 11/2007 | Kato et al. .................. 340/572.8 |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0087990 A1 | 4/2008 | Kato et al. |
| 2008/0169905 A1 | 7/2008 | Slatter |
| 2008/0272885 A1 | 11/2008 | Atherton |
| 2009/0002130 A1 | 1/2009 | Kato |
| 2009/0009007 A1 | 1/2009 | Kato et al. |
| 2009/0065594 A1 | 3/2009 | Kato et al. |
| 2009/0109102 A1 | 4/2009 | Dokai et al. |
| 2009/0160719 A1 | 6/2009 | Kato et al. |
| 2009/0262041 A1 | 10/2009 | Ikemoto et al. |
| 2009/0278687 A1 * | 11/2009 | Kato .......................... 340/572.1 |

FOREIGN PATENT DOCUMENTS

| | | |
|---|---|---|
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 343 223 A1 | 9/2003 |
| EP | 1 357 511 A2 | 10/2003 |
| EP | 1 548 872 A1 | 6/2005 |
| EP | 1 703 589 A1 | 9/2006 |
| EP | 1 841 005 A1 | 10/2007 |
| EP | 2 009 738 A1 | 12/2008 |
| EP | 2 148 449 A1 | 1/2010 |
| GB | 2 305 075 A | 3/1997 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-102424 A | 4/1999 |

(56) References Cited

FOREIGN PATENT DOCUMENTS

| | | |
|---|---|---|
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-243797 A | 9/2000 |
| JP | 2000-251049 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2000-349680 A | 12/2000 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-232221 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-096566 A | 3/2004 |
| JP | 2004-127230 A | 4/2004 |
| JP | 2004-519916 A | 7/2004 |
| JP | 2004-253858 A | 9/2004 |
| JP | 2004-527864 A | 9/2004 |
| JP | 2004-280390 A | 10/2004 |
| JP | 2004-287767 A | 10/2004 |
| JP | 2004-297249 A | 10/2004 |
| JP | 2004-297681 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-124061 A | 5/2005 |
| JP | 2005-129019 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |

(56) References Cited

FOREIGN PATENT DOCUMENTS

| | | |
|---|---|---|
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2007-007888 A | 1/2007 |
| JP | 2007-13120 A | 1/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-122542 A | 5/2007 |
| JP | 2007-150868 A | 6/2007 |
| JP | 2007-159083 A | 6/2007 |
| JP | 2007-159129 A | 6/2007 |
| JP | 2007-228325 A | 9/2007 |
| JP | 2007-266999 A | 10/2007 |
| JP | 2007-312350 A | 11/2007 |
| JP | 4069958 B2 | 4/2008 |
| JP | 2008-160874 A | 7/2008 |
| JP | 11-175678 A | 1/2009 |
| JP | 2009-27291 A | 2/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/083575 A1 | 7/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/140037 A1 | 11/2008 |
| WO | 2009/011376 A1 | 1/2009 |
| WO | 2009/081719 A1 | 7/2009 |

OTHER PUBLICATIONS

English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126, Dec. 23, 2014.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.

(56) References Cited

OTHER PUBLICATIONS

Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008, 2009.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official communication issued in counterpart International Application No. PCT/JP2008/071502, mailed Feb. 24, 2009, 2008.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.

* cited by examiner

FIG. 11A
PRIOR ART
FIG. 11B
PRIOR ART
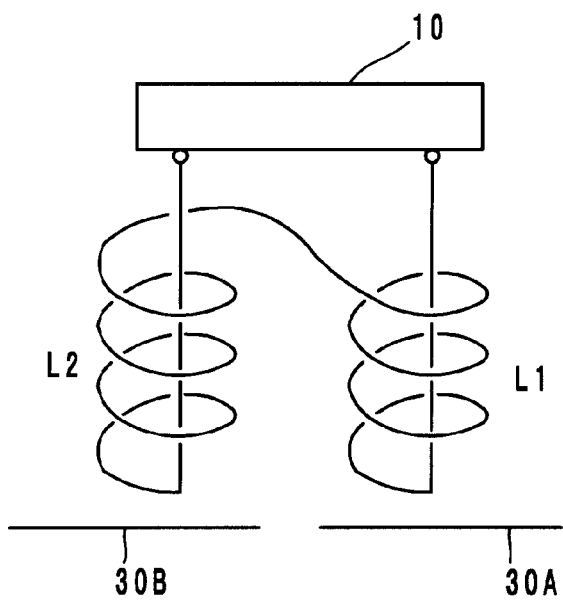
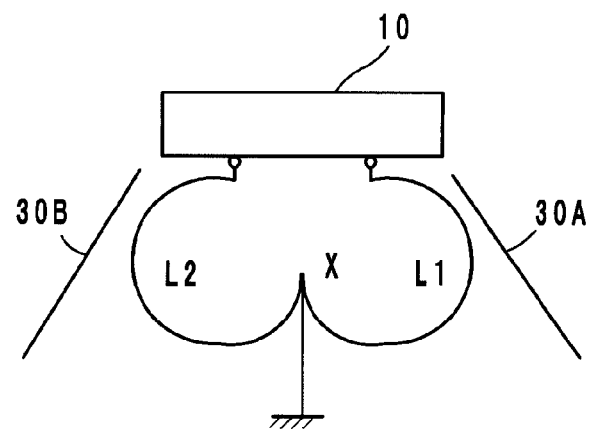

WIRELESS IC DEVICE AND ELECTROMAGNETIC COUPLING MODULE

BACKGROUND OF THE INVENTION

1. Field of the Invention

The present invention relates to wireless IC devices.

In particular, the present invention relates to a wireless IC device used in an RFID (radio frequency identification) system and to an electromagnetic coupling module included in the wireless IC device.

2. Description of the Related Art

An RFID system has been developed and used as an article management system. The RFID system includes a reader/writer that generates an induction field and communicates in a non-contact manner with an IC tag (also referred to as a wireless IC device) which stores specific information and is attached to an article. Thus, information is transmitted between the reader/writer and the IC tag. A wireless IC device used in such an RFID system is disclosed in PCT International Publication WO2009/081719. As illustrated in FIG. 11A, a wireless IC device includes two inductance elements L1 and L2 (helically connected coil conductors) that are electrically connected to a wireless IC chip 10 and electromagnetically coupled to radiation plates 30A and 30B.

However, in the above-described wireless IC device, coil conductors on the bottom layer which face the radiation plates 30A and 30B are arranged in the vicinity of connection points to the wireless IC chip 10 having a high impedance, as illustrated in FIG. 11B. Such arrangement increases the impedance of the inductance elements L1 and L2, which makes it difficult to ensure impedance matching between the wireless IC chip 10 and the radiation plates 30A and 30B. In FIG. 11B, the connection point X of the inductance elements L1 and L2 serves as a virtual ground.

SUMMARY OF THE INVENTION

Accordingly, preferred embodiments of the present invention provide a wireless IC device and an electromagnetic coupling module which provide desirable impedance matching between a wireless IC and a radiation plate through an inductance element and improve the efficiency of energy transmission between a feeder circuit and the radiation plate.

A wireless IC device according to a preferred embodiment of the present invention includes a wireless IC, a feeder circuit which is coupled to the wireless IC and includes an inductance element, and a radiation plate which is coupled to the inductance element. The radiation plate radiates a transmission signal supplied from the feeder circuit and/or supplies a reception signal to the feeder circuit. The inductance element includes a plurality of stacked layers including electrically connected coil conductors. A coil conductor electrically connected in a middle portion of the inductance element is arranged at an end position in a coil axis direction and faces the radiation plate.

An electromagnetic coupling module according to a preferred embodiment of the present invention includes a wireless IC and a feeder circuit substrate having a feeder circuit including an inductance element coupled to the wireless IC. The inductance element includes a plurality of stacked layers including electrically connected coil conductors. A coil conductor electrically connected in a middle portion of the inductance element is arranged at an end position in a coil axis direction.

The wireless IC device and the electromagnetic coupling module according to the preferred embodiments include a electrically connected coil conductor in a middle portion of the inductance element coupled to the wireless IC. The coil conductor is arranged at an end position in the coil axis direction. When the middle portion is coupled to a radiation plate, the radiation plate is coupled in the vicinity of the virtual ground of the inductance element where the impedance is low (a large magnetic field is present). This arrangement provides desirable impedance matching between the wireless IC and the radiation plate and thus improves the efficiency of energy transmission between the feeder circuit and the radiation plate.

According to a preferred embodiment of the present invention, desirable impedance matching between a wireless IC and a radiation plate is achieved with an inductance element, and the efficiency of energy transmission between a feeder circuit and the radiation plate is improved.

The above and other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 11A is a perspective view illustrating coupling between inductance elements and radiation plates according to the related art.

FIG. 11B schematically illustrates a virtual ground of the inductance elements and radiation plates according to the related art.

DETAILED DESCRIPTION OF THE PREFERRED EMBODIMENTS

A wireless IC device and a coupling method according to preferred embodiments of the present invention will be described with reference to the attached drawings.

First Preferred Embodiment

Figure 1:
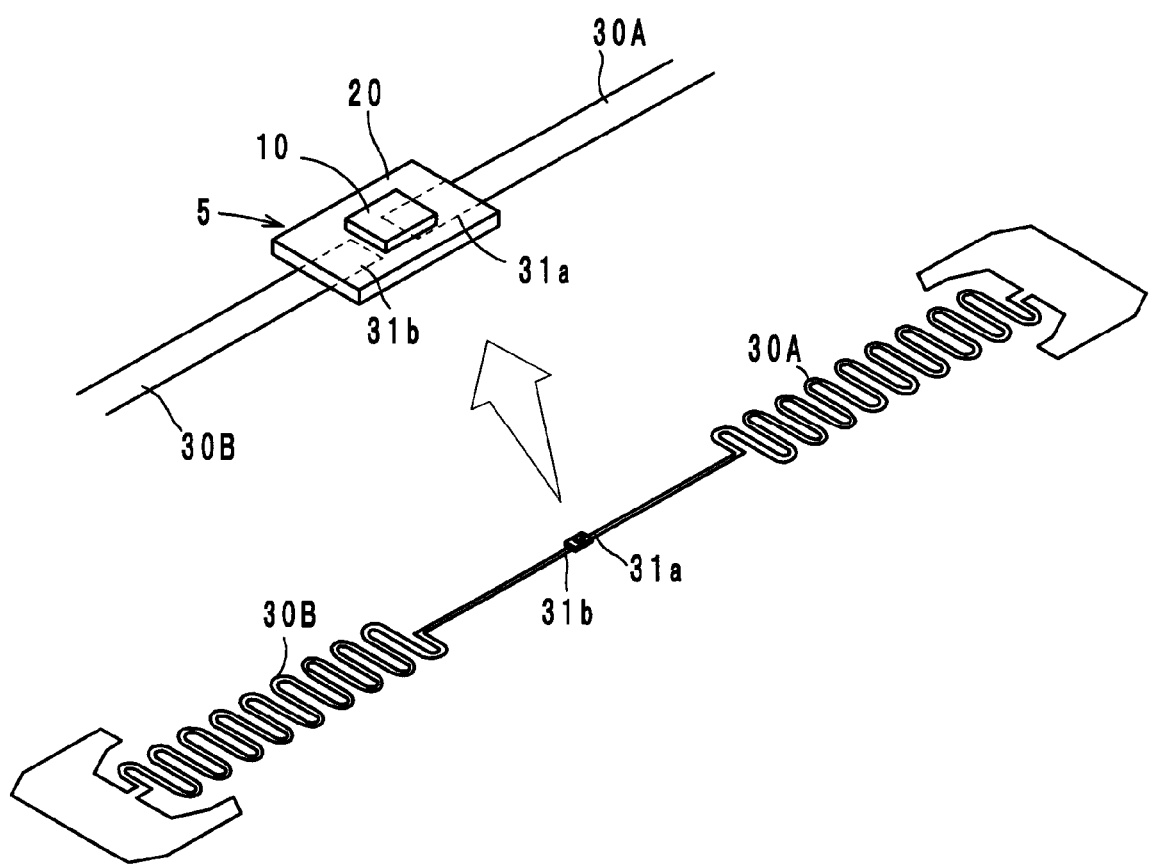
FIG. 1 is a perspective view illustrating a wireless IC device according to a first preferred embodiment of the present invention.

Referring to FIG. 1, a wireless IC device according to the first preferred embodiment includes a wireless IC chip 10 arranged to process a transmission/reception signal having a predetermined frequency, a feeder circuit substrate 20 on which the wireless IC chip 10 is mounted, and two radiation plates 30A and 30B.

The feeder circuit substrate 20 includes a feeder circuit 21 having a resonant circuit/matching circuit including inductance elements that have substantially the same inductance and are helically wound in the same direction. The winding axes of the inductance elements L1 and L2 are arranged at different positions in plan view.

Figure 2:
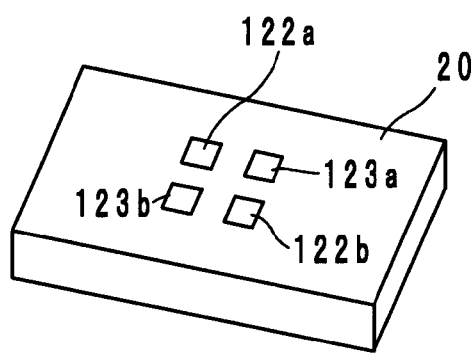
FIG. 2 is a perspective view illustrating a feeder circuit substrate included in a wireless IC device according to the first preferred embodiment of the present invention.
Figure 3:
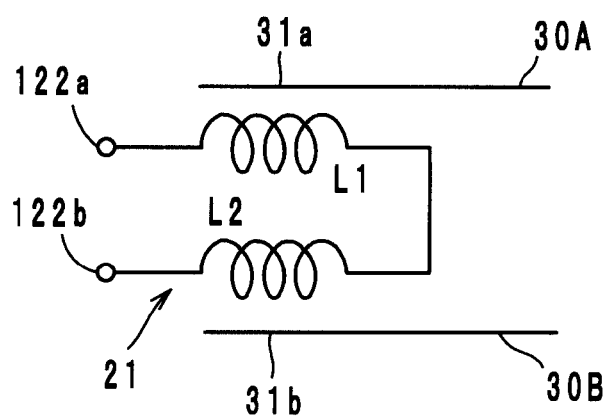
FIG. 3 is an equivalent circuit diagram illustrating a feeder circuit and radiation plates according to the first preferred embodiment of the present invention.

The wireless IC chip 10 may preferably include circuits such as a clock circuit, a logic circuit, and a memory circuit and stores necessary information. A pair of input/output terminal electrodes and a pair of mounting terminal electrodes (not illustrated) are provided on the bottom surface of the wireless IC chip 10. Referring to FIG. 2, the input/output terminal electrodes are electrically connected to feeding terminal electrodes 122*a* and 122*b* provided on the feeder circuit substrate 20 through metal bumps or the like. The mounting terminal electrodes are electrically connected to mounting electrodes 123*a* and 123*b* provided on the feeder circuit substrate 20 through metal bumps or the like.

The wireless IC chip 10 and the feeder circuit substrate 20 are thus integrated into a single module. This module is hereinafter referred to as an electromagnetic coupling module 5. Note that the wireless IC chip 10 and the feeder circuit 21 may not be electrically connected to each other and may instead be electromagnetically coupled to each other.

Each of the radiation plates 30A and 30B preferably has a meandering shape and is arranged on a flexible resin film (not illustrated). The radiation plates 30A and 30B are preferably composed of a non-magnetic metal material. One end of the radiation plate 30A is a coupling portion 31*a* and one end of the radiation plate 30B is a coupling portion 31*b*. The feeder circuit substrate 20 is attached onto the coupling portions 31*a* and 31*b*. Specifically, the coupling portions 31*a* and 31*b* are arranged in the vicinity of the inductance elements L1 and L2, respectively, so as to be perpendicular or substantially perpendicular to the coil axes of the respective inductance elements L1 and L2. Note that the radiation plates 30A and 30B may be composed of a single conductive material forming a loop. In this case, the opposite ends of the loop may serve as the coupling portions 31*a* and 31*b*.

The inductance elements L1 and L2 included in the feeder circuit 21 are magnetically coupled to each other to resonate with a frequency processed by the wireless IC chip 10 and are also magnetically coupled (or electrically coupled) to the coupling portions 31*a* and 31*b*, respectively, of the radiation plates 30A and 30B. The feeder circuit 21 serves to match the impedance of the wireless IC chip 10 and the impedance of the radiation plates 30A and 30B, which will be described below.

Figure 4A:
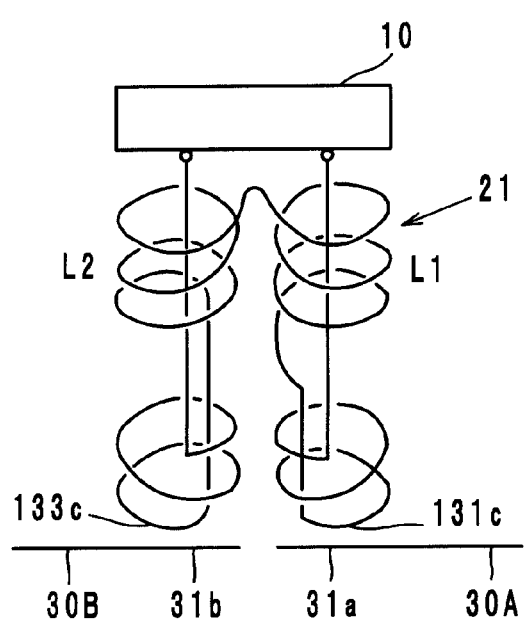
FIG. 4A schematically illustrates coupling between inductance elements and radiation plates according to the first preferred embodiment of the present invention.
Figure 5:
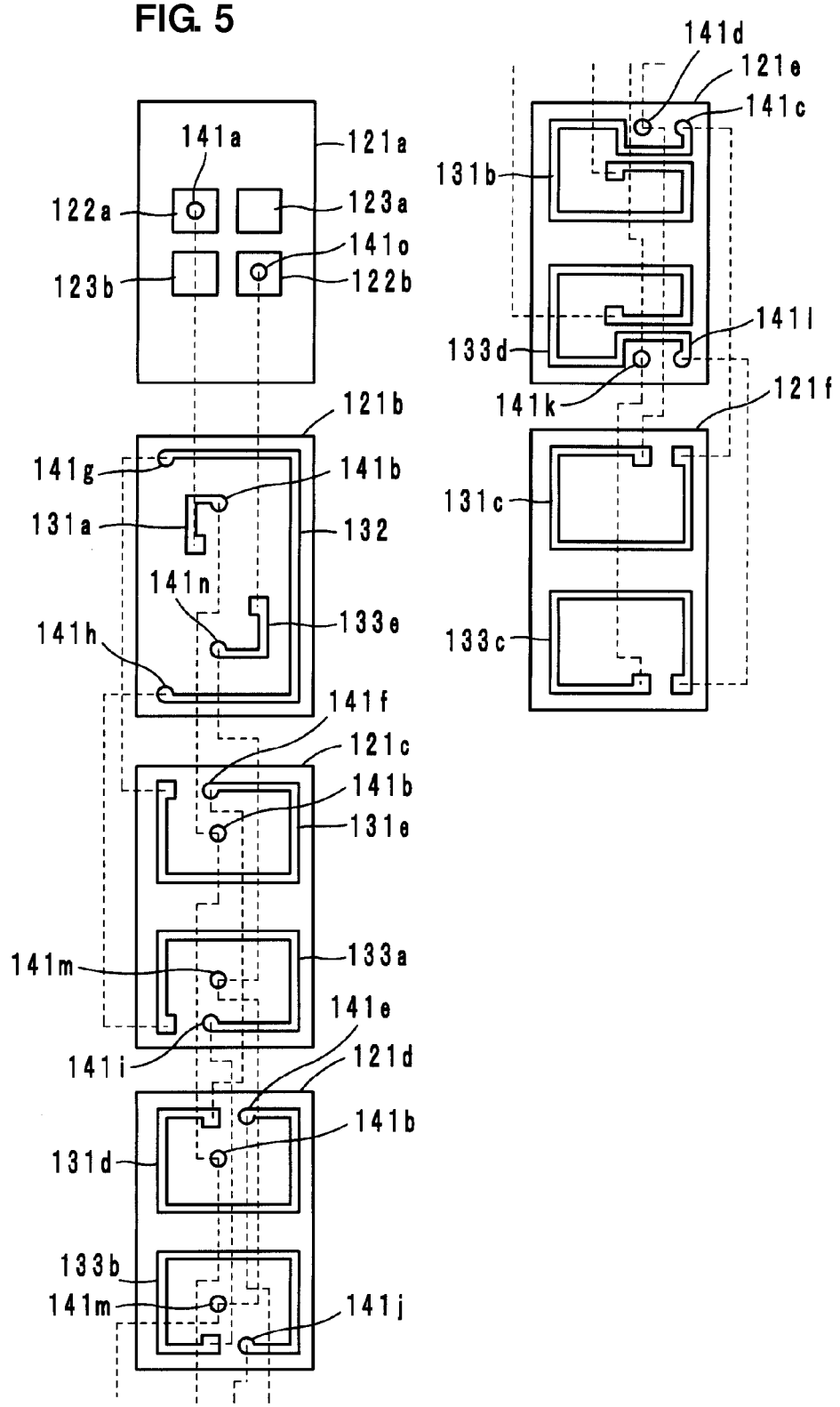
FIG. 5 is an exploded plan view illustrating a stacked structure of a feeder circuit substrate according to the first preferred embodiment of the present invention.

As illustrated in FIG. 4A and FIG. 5, the inductance elements L1 and L2 preferably include a plurality of layers including electrically connected coil conductors 131*a* to 131*e*, 132, and 133*a* to 133*e*. The coil conductors 131*c* and 133*c* electrically connected in middle portions of the respective inductance elements L1 and L2 are arranged at end positions in the coil axis direction and face the coupling portions 31*a* and 31*b* of the radiation plates 30A and 30B, respectively.

Figure 4B:
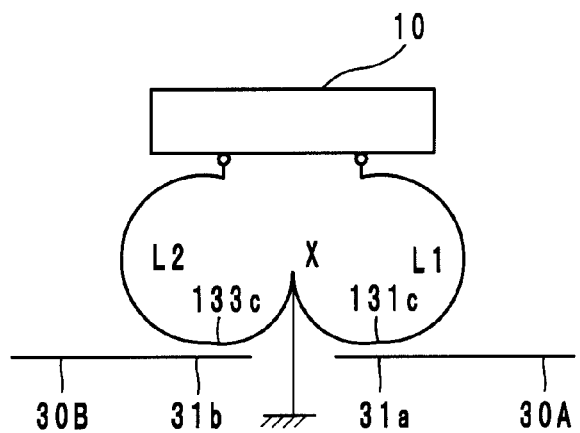
FIG. 4B schematically illustrates a virtual ground of inductance elements and radiation plates.

FIG. 4B schematically illustrates the coupling between the inductance element L1 and the radiation plate 30A and the coupling between the inductance element L2 and the radiation plate 30B. In FIG. 4B, the point X at which the ends of the inductance elements L1 and L2 are connected serves as a virtual ground. The impedance is minimized at the virtual ground. In contrast, the impedance of the inductance elements L1 and L2 is maximized at the points connected to the wireless IC chip 10. In the first preferred embodiment, the coil conductors 131*c* and 133*c* electrically connected in the middle portions near the virtual ground (at which the impedance is minimized, that is, a large magnetic field is present) of the inductance elements L1 and L2 are electromagnetically coupled to the radiation plates 30A and 30B, respectively. Accordingly, impedances are matched suitably between the wireless IC chip 10 having a high impedance and the radiation plates 30A and 30B having a low impedance. As a result, the efficiency of energy transmission between the feeder circuit 21 and the radiation plates 30A and 30B is improved.

In the first preferred embodiment, the feeder circuit transmits a transmission signal having a predetermined frequency transmitted by the wireless IC chip 10 to the radiation plates 30A and 30B. The feeder circuit 21 also selects a reception signal having a predetermined frequency from among signals received by the radiation plates 30A and 30B and supplies the selected signal to the wireless IC chip 10. Thus, in the wireless IC device, the wireless IC chip 10 is activated by a signal received by the radiation plates 30A and 30B and a response signal from the wireless IC chip 10 is radiated outward from the radiation plates 30A and 30B.

As described above, in the wireless IC device, a signal frequency is set in the feeder circuit 21 provided to the feeder circuit substrate 20. Therefore, the wireless IC device can operate directly when attached to various types of articles, and variations in radiation characteristics can be prevented. There is no need to make design changes to the radiation plates 30A and 30B or the like for the individual articles. The frequency of a transmission signal to be transmitted from the radiation plates 30A and 30B and the frequency of a reception signal to be supplied to the wireless IC chip 10 are substantially equal to a resonant frequency of the feeder circuit 21 on the feeder circuit substrate 20. The maximum gain of each signal substantially depends on at least one of the size or shape of the radiation plates 30A and 30B, distance between the feeder circuit 21 and the radiation plates 30A and 30B, and media of the feeder circuit and the radiation plates 30A and 30B. Since a frequency of a transmission/reception signal is determined by the feeder circuit substrate 20, the shape, size, position, and the like of the radiation plates 30A and 30B do not affect the frequency. For example, even if the wireless IC device is rolled up or sandwiched between dielectric materials, frequency characteristics are not changed and can be made stable.

An example of a stacked structure of the feeder circuit substrate 20 will be described with reference to FIG. 5. The feeder circuit substrate 20 is preferably composed of ceramic sheets 121*a* to 121*f* made of a dielectric material or a magnetic material which are stacked, press-bonded, and fired, for example. The feeding terminal electrodes 122*a* and 122*b*, the mounting electrodes 123*a* and 123*b*, and via hole conductors 141*a* and 141*o* are formed on the sheet 121*a* of the top layer. Coil conductors 131*a* to 131*e*, 132, and 133*a* to 133*e*, and via hole conductors 141*b* to 141*n* are formed on the sheets 121*b* to 121*f*.

The inductance elements L1 and L2 are formed by helically connecting the coil conductors 131*a* to 131*e*, 132, and 133*a* to 133*e* through the via hole conductors 141*c* to 141*n*. The inductance elements L1 and L2 are connected to each other through the coil conductor 132 on the sheet 121*b*. Specifically, an end of the coil conductor 131*a* on the sheet 121*b* is connected to the feeding terminal electrode 122a through the via hole conductor 141a, and an end of the coil conductor 133e on the sheet 121b is connected to the feeding terminal electrode 122b through the via hole conductor 141o. Further, as described above, the coil conductors 131c and 133c on the sheet 121f of the bottom layer are electrically connected in middle portions of the inductance elements L1 and L2 and face the radiation plates 30A and 30B.

Second Preferred Embodiment

Figure 6:
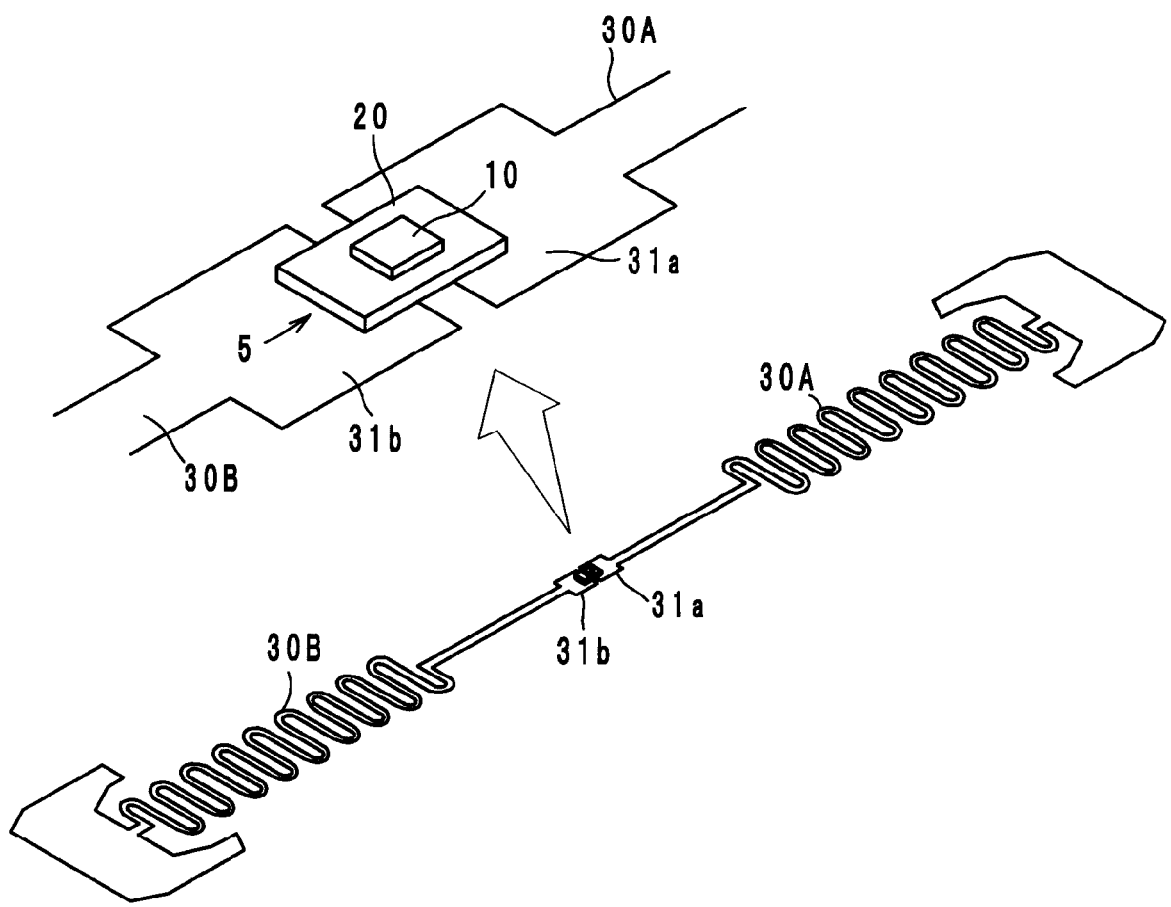
FIG. 6 is a perspective view illustrating a wireless IC device according to a second preferred embodiment of the present invention.

FIG. 6 illustrates a wireless IC device according to the second preferred embodiment of the present invention. The wireless IC device preferably has basically the same configuration as the wireless IC device illustrated in FIG. 1. The wireless IC device according to the second preferred embodiment is different from the wireless IC device illustrated in FIG. 1 in that inductance elements L1 and L2 incorporated in a feeder circuit substrate 20 have different configurations and one end of a radiation plate 30A and one end of a radiation plate 30B are plate-shaped coupling portions 31a and 31b, respectively, as illustrated in FIG. 6.

Figure 7A:
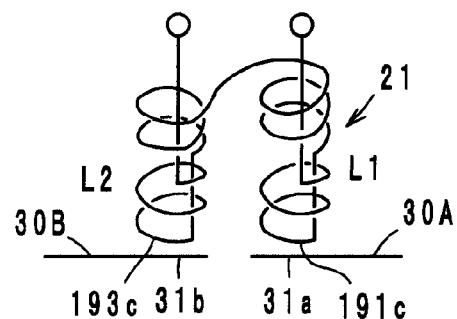
FIGS. 7A to 7F illustrate coupling between a feeder circuit and radiation plates.

As illustrated in FIG. 7A, the feeder circuit substrate 20 has a feeder circuit 21 including a resonant circuit/matching circuit including the inductance elements L1 and L2 that have substantially the same inductance and are helically wound in opposite directions. The winding axes of the inductance elements L1 and L2 are arranged at different positions in plan view. The feeder circuit substrate 20 is attached onto the plate-shaped coupling portions 31a and 31b, which are the ends of the radiation plates 30A and 30B, respectively. That is, the plate-shaped coupling portions 31a and 31b are arranged in the vicinity of the inductance elements L1 and L2, respectively, so as to be orthogonal to the respective winding axes of the inductance elements L1 and L2.

The inductance elements L1 and L2 included in the feeder circuit 21 are magnetically coupled in opposite phases. The inductance elements L1 and L2 resonate with a frequency processed by the wireless IC chip 10 and are coupled to the coupling portions 31a and 31b of the radiation plates 30A and 30B by the action of eddy currents, which will be described below. The feeder circuit 21 serves to match impedances between the wireless IC chip 10 and the radiation plates 30A and 30B. The inductance elements L1 and L2 may have different inductances or may have substantially the same inductance. If the inductance elements L1 and L2 have substantially the same inductance, leakage of a magnetic field in a closed loop can be reduced and coupling loss can be suppressed.

Figure 7D:
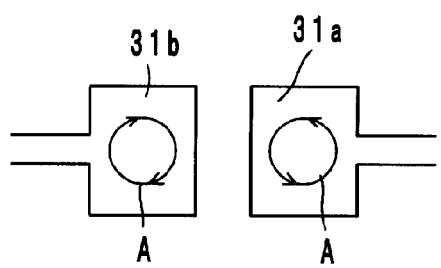
Figure 7B:
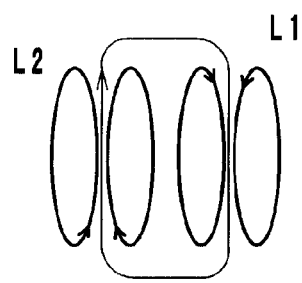

The coupling between the feeder circuit 21 and the radiation plates 30A and 30B will be described with reference to FIGS. 7A to 7F. As illustrated in FIG. 7A, the inductance elements L1 and L2 are wound in opposite directions and have opposite current paths. Thus, the inductance elements L1 and L2 generate opposite magnetic fields and no distant field, and therefore the feeder circuit substrate 20 does not function as an antenna. Since the inductance elements L1 and L2 are wound in opposite directions, the magnetic field defines a single closed loop and does not leak to the outside, as illustrated in FIG. 7B. Thus, unlike in typical magnetic coupling, no energy, except for the energy used for coupling, can be released.

Figure 7E:
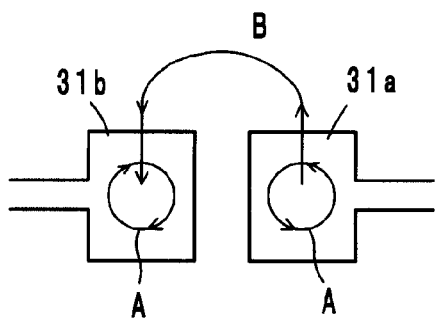
Figure 7C:
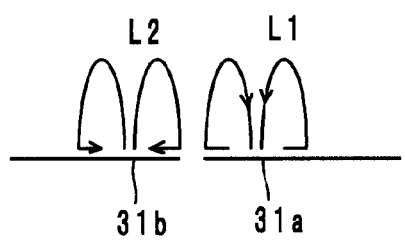
Figure 7F:
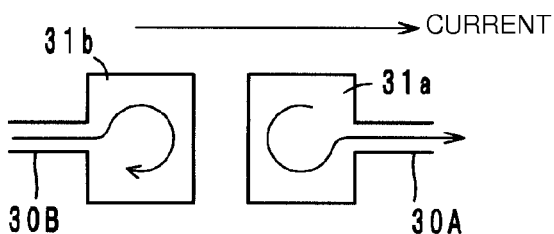

As illustrated in FIG. 7C, the magnetic fields generated by the inductance elements L1 and L2 are applied perpendicularly to the plate-shaped coupling portions 31a and 31B that respectively face the inductance elements L1 and L2. As a result, an eddy current A occurs in each of the coupling portions 31a and 31b, as illustrated in FIG. 7D. The eddy currents flow in opposite directions in the plate-shaped coupling portions 31a and 31b that are arranged adjacent to each other. Thus, as illustrated in FIG. 7E, the eddy currents produce a magnetic field defining a single closed loop, which yields a secondary magnetic field B making the plate-shaped coupling portions 31a and 31b attract each other. As a result, as illustrated in FIG. 7F, electrons for neutralizing the magnetic field flow from an end of the secondary magnetic field B to the other end thereof. Thus, even when the radiation plates 30A and 30B are separated from each other, a current flows in and out of the adjacent plate-shaped coupling portions 31a and 31b from the outside, and a current flows through the radiation plates 30A and 30B.

Note that the radiation plates 30A and 30B may be made of a single conductor which defines a loop. The coupling that utilizes eddy currents is not affected by the line length of a radiation plate. In addition, coupling efficiency is unaffected by the form of the radiation plate, whether separated into two plates or made to be a loop. However, if the line length of each of the radiation plates 30A and 30B is $\lambda/4$ (the entire line length is $\lambda/2$), resonance conditions are satisfied, voltage is maximized and current is minimized at the end portions, and a current flows more easily through the radiation plate.

That is, with the magnetic fields formed by the adjacent eddy currents, the eddy currents originate from the opposing plate-shaped coupling portions 31a and 31b and flow through the radiation plates 30A and 30B. Thus, unlike in typical magnetic coupling or electrical coupling, a magnetic field is directed perpendicularly or substantially perpendicularly to the plate-shaped coupling portions 31a and 31b, which dynamically generates eddy currents. Consequently, energy for supplying a current through the radiation plates 30A and 30B originates from the adjacent eddy currents. Such transmission (coupling) of energy is realized when plates are arranged perpendicularly or substantially perpendicularly to a pair of oppositely wound coils and eddy currents flow in the plates. Therefore, energy is not transmitted through radiation plates when a plate-shaped coupling portion is arranged at only one of the inductance elements L1 and L2.

Also in the second preferred embodiment, the wireless IC chip 10 is activated by a signal received by the radiation plates 30A and 30B, and a response signal is radiated from the wireless IC chip 10 outward from the radiation plates 30A and 30B, similarly to the first preferred embodiment. In addition, the radiation plates 30A and 30B are electromagnetically coupled to the coil conductors in the middle portions of the inductance elements L1 and L2 which are arranged near the virtual ground, at which the impedance is minimized, that is, a large magnetic field is present. This arrangement can provide desirable matching between the wireless IC chip 10 having a high impedance and the radiation plate 30A and 30B having a low impedance. As a result, the efficiency of energy transmission between the feeder circuit 21 and the radiation plates 30A and 30B can be improved. Other operation and effects in the second preferred embodiment are similar to those in the first preferred embodiment.

Figure 8:
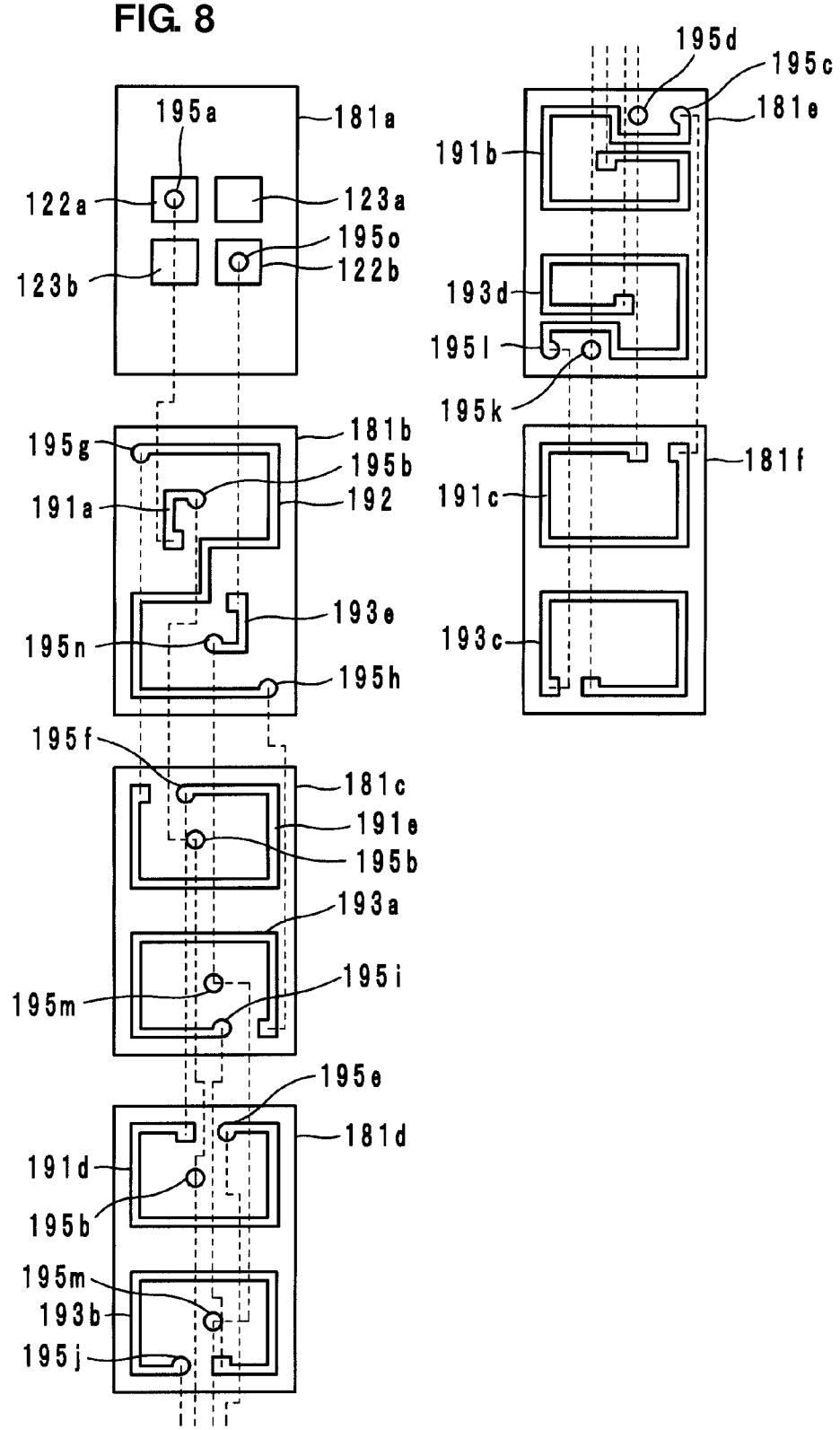
FIG. 8 is an exploded plan view illustrating a stacked structure of a feeder circuit substrate according to the second preferred embodiment of the present invention.

Referring now to FIG. 8, an example of a stacked structure of the feeder circuit substrate 20 will be described. The feeder circuit substrate 20 includes ceramic sheets 181a to 181f preferably made of a dielectric material or a magnetic material that are stacked, press-bonded, and fired. Feeding terminal electrodes 122a and 122b, mounting electrodes 123a and 123b and via hole conductors 195a and 195o are provided on the sheet 181a of the top layer. Coil conductors 191a to 191e, 192, and 193a to 193e, and via hole conductors 195b to 195n are provided on the sheets 181b to 181f.

The inductance elements L1 and L2 are preferably formed by helically connecting the coil conductors 191a to 191e, 192, and 193a to 193e through the via hole conductors 195c to 195n. The inductance elements L1 and L2 are connected to each other through the coil conductor 192 on the sheet 181b. An end of the coil conductor 191a on the sheet 181b is connected to the feeding terminal electrode 122a through the via hole conductor 195a, and an end of the coil conductor 193e on the sheet 181b is connected to the feeding terminal electrode 122b through the via hole conductor 195o. Further, as described above, the coil conductors 191c and 193c on the sheet 181f of the bottom layer are electrically connected in the middle portions of the inductance elements L1 and L2 and face the radiation plates 30A and 30B.

Third Preferred Embodiment

Figure 9:
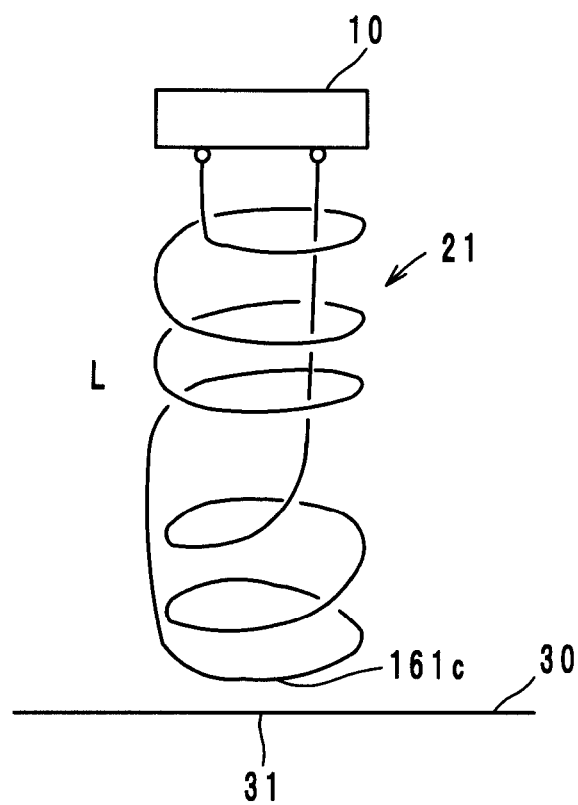
FIG. 9 is a perspective view illustrating coupling between an inductance element and a radiation plate according to a third preferred embodiment of the present invention.

Referring to FIG. 9, a wireless IC device according to the third preferred embodiment of the present invention has basically the same structure as the wireless IC device illustrated in FIG. 1. The wireless IC device according to the third preferred embodiment is different from the wireless IC device in FIG. 1 in that a feeder circuit 21 has a single inductance element L.

The inductance element L preferably includes a plurality of layers having electrically connected coil conductors 161a to 161e. The coil conductor 161c electrically connected in a middle portion of the inductance element L is arranged at an end position in the coil axis direction and faces a coupling portion 31 of a radiation plate 30.

Both ends of the inductance element L are electrically connected to input/output terminal electrodes of a wireless IC chip 10. The magnetic field is largest and the impedance is minimized at the coil conductor 161c in the middle portion. In the third preferred embodiment, the radiation plate 30 is electromagnetically coupled to the coil conductor 161c in the middle portion where the impedance of the inductance element L is minimized, that is, a large magnetic field is present. This arrangement can suitably match impedances between the wireless IC chip 10 having a high impedance and the radiation plate having a low impedance. As a result, the efficiency of energy transmission between the feeder circuit 21 and the radiation plate 30 is improved. The other operations and effects are similar to those in the first preferred embodiment described above.

Figure 10:
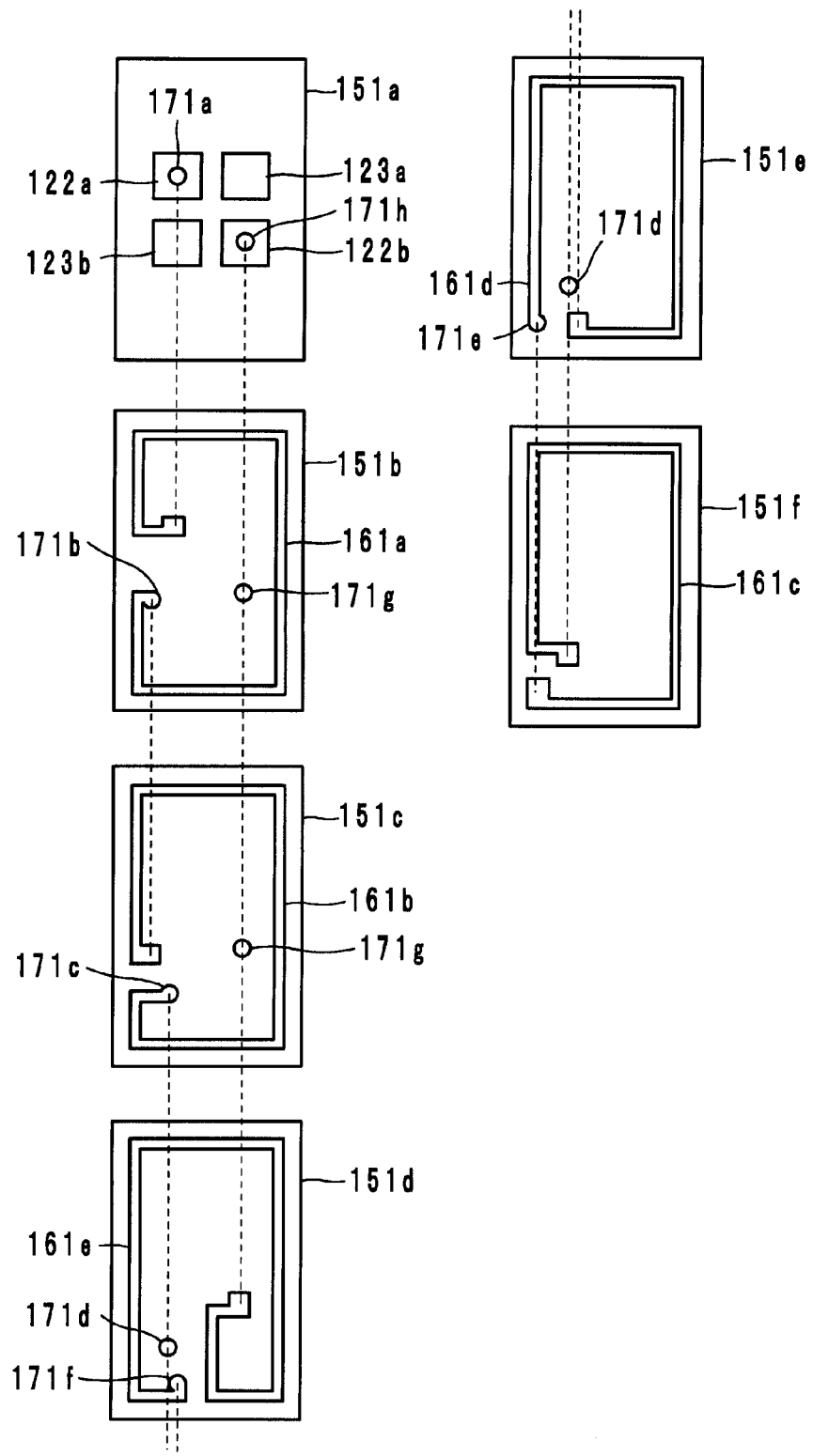
FIG. 10 is an exploded plan view illustrating a stacked structure of a feeder circuit substrate according to the third preferred embodiment of the present invention.

Referring to FIG. 10, an example of a stacked structure of the feeder circuit substrate 20 will be described. The feeder circuit substrate 20 includes ceramic sheets 151a to 151f made of a dielectric material or a magnetic material that are stacked, press-bonded, and fired. Feeding terminal electrodes 122a and 122b, mounting electrodes 123a and 123b, and via hole conductors 171a and 171h are provided on the sheet 151a of the top layer. Coil conductors 161a to 161e and via hole conductors 171b to 171g are provided on the sheets 151b to 151f.

The inductance element L is preferably formed by helically connecting the coil conductors 161a to 161e through the via hole conductors 171b to 171f. An end of the coil conductor 161a on the sheet 151b is connected to the feeding terminal electrode 122a through the via hole conductor 171a, and an end of the coil conductor 161e on the sheet 151d is connected to the feeding terminal electrode 122b through the via hole conductors 171g and 171h. The coil conductor 161c on the sheet 151f of the bottom layer is electrically connected in the middle portion of the inductance element L, faces the radiation plate 30, and is magnetically coupled to the radiation plate 30.

Other Preferred Embodiments

A wireless IC device and an electromagnetic coupling module according to a preferred embodiment of the present invention are not limited to the preferred embodiments described above, and various modifications may be made within the scope of the present invention.

For example, the wireless IC is not limited to a chip type IC and may be integrated into a feeder circuit substrate. Radiation plates in various shapes may be used. Further, while a coil axis of an inductance element is preferably arranged perpendicularly or substantially perpendicularly to the wireless IC in the above preferred embodiments, the coil axis may be arranged parallel or substantially parallel to the wireless IC.

As described above, a preferred embodiment of the present invention can advantageously be applied to a wireless IC device and an electromagnetic coupling module. In particular, the present invention is advantageous in providing desirable impedance matching between a wireless IC and a radiation plate and improving the efficiency of energy transmission between a feeder circuit and the radiation plate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless IC device comprising:
a wireless IC;
a feeder circuit substrate including a plurality of sheets and a feeder circuit connected to the wireless IC, the feeder circuit including an inductance element;
a radiation plate arranged to radiate a transmission signal supplied from the feeder circuit or supply a reception signal to the feeder circuit; and
a plate-shaped coupling portion connected to the radiation plate; wherein
the inductance element includes first, second, and third coil conductors connected in series in this order to one another;
each of the first, second, and third coil conductors is disposed on a different one of the plurality of sheets from one another, the plurality of sheets are disposed in planes that are parallel to each other;
the plate-shaped coupling portion faces the second coil conductor;
the feeder circuit is connected to the radiation plate via an electromagnetic coupling between the plate-shaped coupling portion and the second coil conductor; and
the second coil conductor is arranged closer to the plate-shaped coupling portion than the first and third coil conductors with respect to the parallel planes of the plurality of sheets.

2. The wireless IC device of claim 1, wherein the feeder circuit further includes a resonant circuit, and a frequency of at least one of the transmission signal and the reception signal is substantially equal to a resonant frequency of the resonant circuit.

3. The wireless IC device of claim 1, wherein a coil axis direction of the inductance element is perpendicular or substantially perpendicular to the wireless IC, and the second coil conductor is arranged at an end position opposite to a position of the wireless IC in the coil axis direction of the inductance element.

4. The wireless IC device of claim 1, wherein the wireless IC and the inductance element are electrically connected to each other.

5. The wireless IC device of claim 1, wherein the feeder circuit includes two inductance elements, the two inductance elements being electrically connected to each other at end portions thereof in a coil axis direction of the two inductance elements.

6. The wireless IC device of claim 5, wherein the two inductance elements are each helically wound in opposite directions.

7. An electromagnetic coupling module comprising:
a wireless IC; and
a feeder circuit substrate including a plurality of sheets and a feeder circuit including an inductance element connected to the wireless IC; wherein
the inductance element includes first, second and third conductors connected in series in this order to one another;
each of the first, second, and third coil conductors is disposed on a different one of the plurality of sheets from one another, the plurality of sheets are disposed in planes that are parallel to each other;
the second coil conductor is arranged to face a plate-shaped coupling portion connected to a radiation plate such that the feeder circuit is connected to the radiation plate via an electromagnetic coupling between the coupling portion and the second coil conductor; and
the second coil conductor is arranged closer to the plate-shaped coupling portion than the first and third coil conductors with respect to the parallel planes of the plurality of sheets.

8. The electromagnetic coupling module of claim 7, wherein a coil axis direction of the inductance element is perpendicular or substantially perpendicular to the wireless IC, and the second coil conductor is arranged at an end position of the inductance element opposite to a position of the wireless IC in the coil axis direction of the inductance element.

9. The electromagnetic coupling module of claim 7, wherein the wireless IC and the inductance element are electrically coupled to each other.

10. The electromagnetic coupling module of claim 7, wherein the feeder circuit includes two inductance elements, the two inductance elements being electrically connected to each other at end portions thereof in a coil axis direction of the two inductance elements.

11. The electromagnetic coupling module of claim 10, wherein the two inductance elements are each helically wound in opposite directions.

12. A wireless IC device comprising:
a wireless IC;
a feeder circuit substrate including a plurality of sheets and a feeder circuit connected to the wireless IC, the feeder circuit including an inductance element;
a radiation plate arranged to radiate a transmission signal supplied from the feeder circuit or supply a reception signal to the feeder circuit; and
a plate-shaped coupling portion connected to the radiation plate; wherein
the inductance element includes first, second and third conductors connected in series in this order to one another;
the first and third coil conductors are disposed on a common one of the plurality of sheets and the second coil conductor is disposed on a different one of the plurality of sheets from the common one of the plurality of sheets, the common one and the different one are disposed in planes that are parallel to each other;
the plate-shaped coupling portion faces the second coil conductor;
the feeder circuit is connected to the radiation plate via an electromagnetic coupling between the plate-shaped coupling portion and the second coil conductor;
the second coil conductor is arranged closer to the plate-shaped coupling portion than the first and third coil conductors with respect to the parallel planes of the common one and the different one of the plurality of sheets; and
a coil axis of the inductance element extends in a direction parallel or substantially parallel to a stacking direction of the plurality of sheets.

13. The wireless IC device of claim 12, wherein the feeder circuit further includes a resonant circuit, and a frequency of at least one of the transmission signal and the reception signal is substantially equal to a resonant frequency of the resonant circuit.

14. The wireless IC device of claim 12, wherein the direction in which the coil axis of the inductance element extends is perpendicular or substantially perpendicular to the wireless IC, and the second coil conductor is arranged at an end position opposite to a position of the wireless IC in the direction in which the coil axis of the inductance element extends.

15. The wireless IC device of claim 12, wherein the wireless IC and the inductance element are electrically connected to each other.

16. The wireless IC device of claim 12, wherein the feeder circuit includes two inductance elements, the two inductance elements being electrically connected to each other at end portions thereof in a coil axis direction of the two inductance elements.

17. The wireless IC device of claim 16, wherein the two inductance elements are each helically wound in opposite directions.

* * * * *